United States Patent

Faltersack

[15] 3,636,938

[45] Jan. 25, 1972

[54] PORTABLE COOKING GRILL

[72] Inventor: Edward J. Faltersack, 19517 Almaden Road, San Jose, Calif. 95120

[22] Filed: Nov. 12, 1968

[21] Appl. No.: 774,770

[52] U.S. Cl. .................................................126/30, 248/165
[51] Int. Cl. ......................A47j 37/00, F24b 3/00, F24c 1/16
[58] Field of Search ..................126/29, 30, 9, 9 B; 248/165, 248/166; 52/645; 99/449

[56] References Cited

UNITED STATES PATENTS

| 970,342 | 9/1910 | Kurt...................................126/30 UX |
| 1,472,668 | 10/1923 | Oliver................................126/30 UX |
| 2,839,043 | 6/1958 | La Born.................................126/30 |
| 2,965,097 | 12/1960 | Clark, Jr................................126/30 |
| 3,191,592 | 6/1965 | Lorbacher............................126/9 X |

*Primary Examiner*—Charles J. Myhre

[57] ABSTRACT

A cooking grill which can be dismantled and reassembled in compact form for storage and ease of handling.

5 Claims, 5 Drawing Figures

PATENTED JAN 25 1972
3,636,938
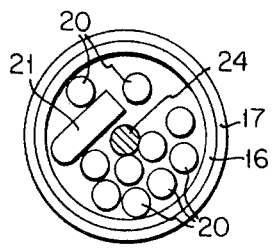
FIG.4
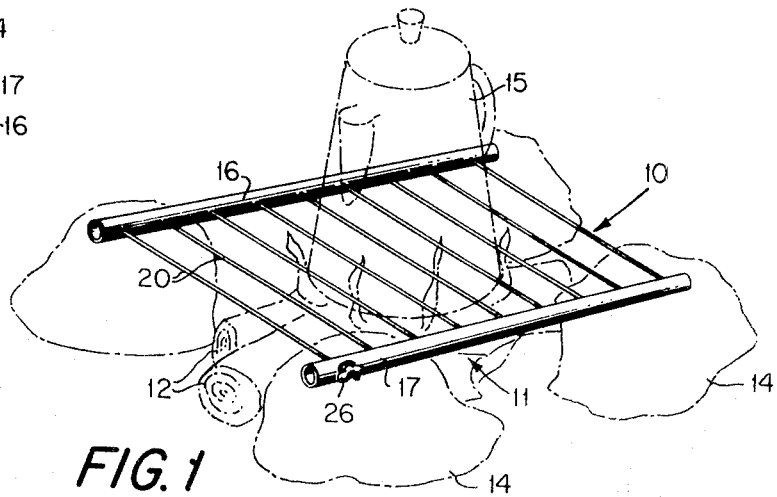
FIG.1
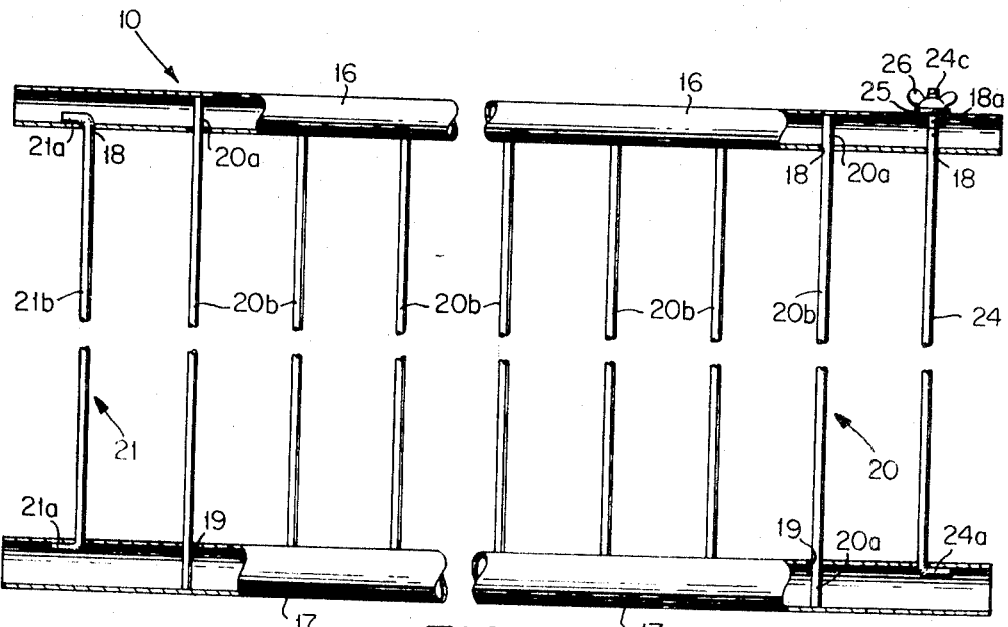
FIG.2
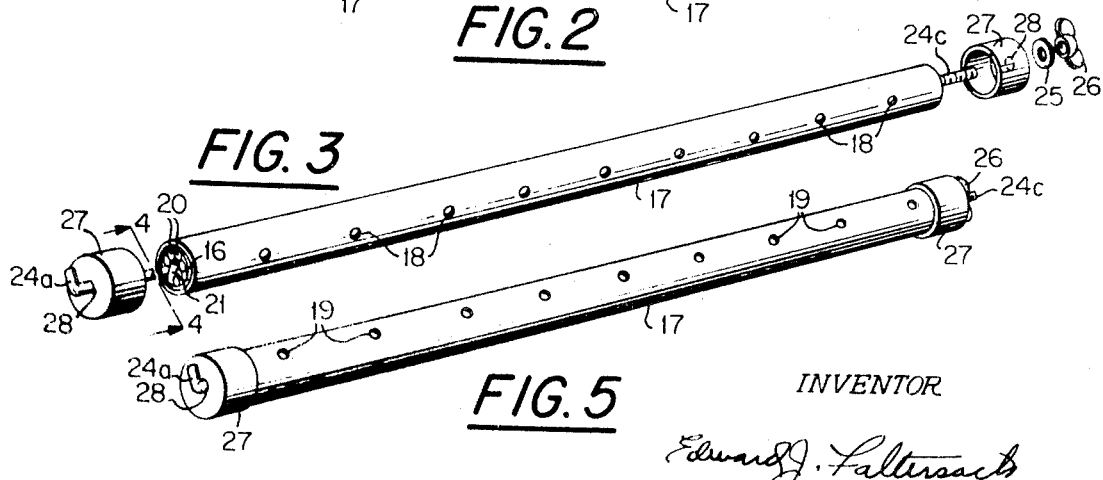
FIG.3
FIG.5
INVENTOR
Edward J. Faltersack

PORTABLE COOKING GRILL

BACKGROUND OF THE INVENTION

This invention pertains to a cooking grill, and more particularly to a portable cooking grill adapted for use on outside campfires.

SUMMARY OF THE INVENTION

A portable cooking grill having parts easily disengaged and assembled in compact form for ease of storage and handling.

The object and operation of this invention will more readily be understood with reference to the following description and related drawings.

DESCRIPTION OF THE DRAWINGS

FIG. 1 shows the invention in use over a campfire;

FIG. 2 is an enlarged view, partially in cross section and broken away, of the subject grill assembled for use in cooking;

FIG. 3 shows the grill dismantled and partially reassembled for storage with the end caps removed;

FIG. 4 is an enlarged cross-sectional view taken along the line 4—4 of FIG. 3; and FIG. 5 shows the grill completely assembled for storage.

DESCRIPTION OF THE INVENTION

In FIG. 1 is shown a cooking grill 10 supported for cooking purposes over a campfire shown in dotted outline. The grill 10 is supported above the fire 11 formed by the burning logs 12. The grill is laid on the rocks 14 to support one or more pots 15 at the proper height for cooking. The use of such a grill enables the moving of the cooking pots around over the fire to select the various degrees of heat essential for each cooking procedure.

In moving from one cooking place to another, the transportation of previously used grills is cumbersome. Frequently, the grills weigh more than necessary, and always the grill occupies considerable space so as to make it substantially impossible to carry. The subject invention makes such a grill easily transportable, even if it is to be carried in a pack during a backpacking expedition. For this purpose the grill of the invention is made to be dismantled with the parts storeable in the form of a neat compact package.

In accordance with the invention, the grill 10 comprises a pair of hollow tubular metallic members 16 and 17 (FIGS. 1 and 2), each having a plurality of aligned holes 18 and 19 formed in one side thereof respectively, and extending completely through one outer wall of each of the members. These tubular members serve as the rigid end members of the grill when positioned in parallel relationship and connected by a plurality of bar members 20.

The bar members 20 preferably are round and preferably are made of a material (such as a stainless steel alloy) capable of withstanding the higher temperatures to which the grill is subjected. The number of bars used is determined by the size of the grill to enable the spacing of the bars to support the weight of each cooking container while preventing the smallest container generally used from tipping over because of insufficient support.

To assemble the grill, the ends 20a of each bar are inserted into aligned holes 18 and 19 in the parallel positioned tubular members 16 and 17. After the bars are so placed, releasable holding means is tightened to bias the tubular members toward one another to clamp the now-assembled grill into a solid assembly. In the example shown, the holding means comprises a holding bar 21 having the ends 21bent at right angles to the elongated portion 21b of the bar. The spacing between the bent ends equals the length of the center exposed portion 20b of the bar member 20 plus the wall thickness of the tubular members 16 and 17. By inserting the holding bar 21 into the tubular members before insertion of any of the bars 20, the tubular members can be manipulated to permit entry of the bent ends 21a into the holes 18 and 19. Thereafter the intermediate bars 20 are inserted until the last two aligned openings at the other end of the tubular members are reached. Into these openings is inserted a clamping bar 24 having one end 24a bent at right angles similar to the ends of the bar 21. Aligned with the end hole 18 is an aligned hole 18a extending through the other wall of the tubular member 16. The clamping rod end 24c is extended through the member 16 and a washer 25 and threaded wingnut 26 placed thereon.

By the tightening of the wingnut 26, the tubular members 16 and 17 are drawn together as they pivot against the holding force of the holding bar 21. Thus the outer walls of the members are forced against the ends 20a of the bars to form a rigid grill assembly suitable for use over a campfire in the manner shown in FIG. 1. Of course, the clamping bar 24 could be used alone to hold the grill in the assembled condition if positioned near the longitudinal centers of the tubular member. However, the embodiment of the invention illustrated in the drawings was found to be the easiest assembled.

Disassembly of the grill is initiated by removal of all the bars from the tubular members. Preferred embodiment of the invention comprises the tubular member 17, being of a smaller outside diameter than the inside diameter of the member 16 such that it can be inserted into the member 16 and the bars 20 be inserted into the center of the member 17 as shown in FIG. 3. In this assembled condition, the grill represents a small compact package easily transportable between places of use. End caps 27 preferably are provided to hold the bars and tubular members together. By inserting the holding bar 24 through the holes 28 in the caps and attaching the wingnut 26 as shown in FIG. 4, the packaged grill is clamped in one assembly for carrying.

While the invention is described in one embodiment, it should be understood by those skilled in the art that other changes in the form and details may be made therein without departing from the invention.

I claim as my invention:

1. A portable grill comprising:
    a pair of elongated members each having a plurality of aligned holes extending into one side thereof with at least a first of said elongated members being hollow;
    a plurality of bar members of smaller diameter cross section than the tubular elongated members and having the ends sized to fit into the aligned holes of the tubular elongated members when the tubular elongated members are positioned in parallel relationship, said bar members being sized to fit within said hollow elongated member for storage; and
    releasable holding means for holding said bar members in said elongated members thereby forming a portable cooking grill which can be dismantled by releasing said holding means.

2. A portable grill as defined in claim 1 wherein said releasable holding means biases said elongated members towards each other to hold the bar members therein.

3. A portable grill as defined in claim 1 wherein said second elongated member is hollow and said first elongated member can be fitted inside said second elongated member for storage after the grill is dismantled.

4. A portable grill as defined in claim 3 wherein both said elongated members are tubular and one elongated member will fit within the other tubular member after the grill is dismantled with the bar members fitting within the inside tubular member.

5. A portable grill as defined in claim 2 wherein said holding means comprises one bar member connectable to one elongated member and having a threaded end extending into the other elongated member whereby after the grill is assembled, a nut can be tightened on said threaded end to bias the elongated members together.

* * * * *